United States Patent
Balakrishnan et al.

[11] Patent Number: 6,154,377
[45] Date of Patent: Nov. 28, 2000

[54] METHOD AND APPARATUS REDUCING OVERSHOOT IN A POWER SUPPLY CONTROLLER

[75] Inventors: Balu Balakrishnan; Alex B. Djenguerian, both of Saratoga, Calif.

[73] Assignee: Power Integrations, Inc., Sunnyvale, Calif.

[21] Appl. No.: 09/415,706

[22] Filed: Oct. 8, 1999

[51] Int. Cl.[7] .................................................. H02M 3/335
[52] U.S. Cl. ................................................. 363/21; 363/49
[58] Field of Search .................................... 363/21, 49, 97, 363/131

[56] References Cited

U.S. PATENT DOCUMENTS

| | | | |
|---|---|---|---|
| 5,675,485 | 10/1997 | Seong | 363/97 |
| 5,694,305 | 12/1997 | King et al. | 363/21 |

*Primary Examiner*—Shawn Riley
*Attorney, Agent, or Firm*—Blakely Sokoloff Taylor & Zafman, LLP

[57] ABSTRACT

A power supply controller with reduced overshoot at the power supply output during start up. In one embodiment, a power supply controller for a switched mode power supply includes a drain terminal to be coupled to a primary winding of a power supply transformer, a source terminal to be coupled to ground and a control terminal. The control terminal is to be coupled to provide bias supply power to the power supply controller and receive a feedback current from the power supply output. The control terminal is also to be coupled to an external capacitor to provide power to the power supply controller during normal operation. The power supply controller includes a charging circuit and a logic circuit to maintain the voltage at the control terminal at a control terminal regulation voltage during start up.

22 Claims, 6 Drawing Sheets

METHOD AND APPARATUS REDUCING OVERSHOOT IN A POWER SUPPLY CONTROLLER

BACKGROUND OF THE INVENTION

1. Field of the Invention

The present invention relates generally to power supplies and, more specifically, the present invention relates to a switched mode power supply controller.

2. Background Information

Electronic devices use power to operate. Switched mode power supplies are commonly used due to their high efficiency and good output regulation to power many of today's electronic devices. In a known switched mode power supply, a low frequency (e.g. 50 Hz or 60 Hz mains frequency), high voltage alternating current (AC) is converted to high voltage direct current (DC) with a diode rectifier and capacitor. The high voltage DC is then converted to high frequency (e.g. 30 to 300 kHz) AC, using a switched mode power supply control circuit. This high frequency, high voltage AC is applied to a transformer to transform the voltage, usually to a lower voltage, and to provide safety isolation. The output of the transformer is rectified to provide a regulated DC output, which may be used to power an electronic device. The switched mode power supply control circuit provides usually output regulation by sensing the output controlling it in a closed loop.

A switched mode power supply may include an integrated circuit power supply controller coupled in series with a primary winding of the transformer. Energy is transferred to a secondary winding from the primary winding in a manner controlled by the power supply controller to provide the clean and steady source of power at the DC output. The transformer of a switched mode power supply may also include another winding called a bias or feedback winding. The bias winding provides the operating power for the power supply controller and in some cases, it also provides a feedback or control signal to the power supply controller. In some switched mode power supplies, the feedback or control signal can come through an opto-coupler from a sense circuit coupled to the DC output. The feedback or control signal may be used to modulate a duty cycle of a switching waveform generated by the power supply controller or may be used to disable some of the cycles of the switching waveform generated by the power supply controller to control the DC output voltage.

Figure 1:
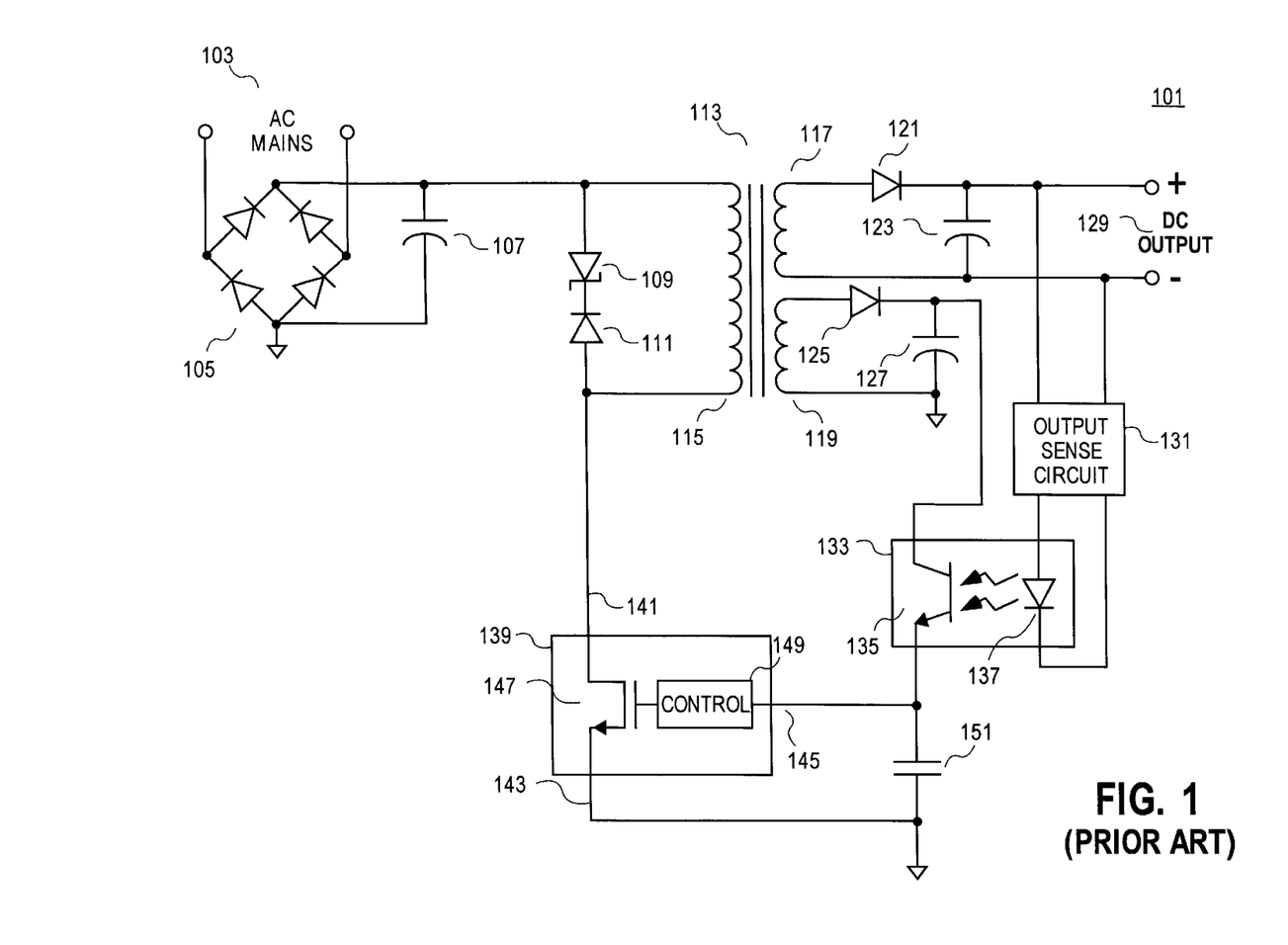
FIG. 1 is a schematic illustrating one embodiment of a power supply including a power supply controller having a combined electrical control terminal coupled to receive a bias supply current as well as the feedback current.

In a power supply controller, where the bias supply power and feedback current are combined to a single electrical terminal, an output overshoot can occur on the power supply output during power-up. To illustrate, FIG. 1 is a diagram showing a power supply 101 including a power supply controller 139 on which bias supply power and feedback current are combined to a single electrical terminal 145. A bridge rectifier 105 and capacitor 107 are coupled to rectify and filter an input alternating current (AC) voltage received at AC mains 103. The rectified voltage is received at a primary winding 115 of a transformer 113. The transformer 113 includes a secondary winding 117 and a bias winding 119. Diode 121 and capacitor 123 rectify and filter the secondary output, whereas diode 125 and capacitor 127 rectify and filter the bias winding. The power supply controller includes a drain terminal 141 coupled to the primary winding 115 and a source terminal 143 coupled to ground. The power supply controller 139 switches a power switch 147 at a predetermined frequency to transfer the energy to the secondary winding 117 using transformer 113. Diode 109 and Zener 111 are used for clamping the drain.

A feedback loop is formed from DC output 129 through output sense circuit 131 to a control terminal 145 of the power supply controller 139. The feedback loop includes the output sense circuit 131 and opto-coupler 133. The opto-coupler 133 includes a transistor 135 that is optically coupled to a photodiode 137. The combined bias supply current as well as the feedback current is provided to the control terminal 145 by the opto-coupler 133 using the bias winding 119. Thus, the control terminal 145 may be characterized as a supply voltage ($V_S$)/feedback terminal for power supply controller 139. This control terminal 145 is therefore frequently referred to as a combined electrical terminal. An external capacitor 151 is connected between control terminal 145 and ground.

Power supply controller 139 is a type of controller that typically uses a shunt regulator and extracts the feedback signal from the shunt current. The extracted feedback signal is derived from the excess current to the bias supply current. Power supply controller 139 usually contains a current source from the drain terminal 141 of the power switch 147 to charge the control terminal 145 to a control terminal regulation voltage during power-up before the power switch 147 can switch. This is illustrated in FIG. 2 with control terminal 145 shown being charged to control terminal regulation voltage 207 at time 201.

Figure 2:
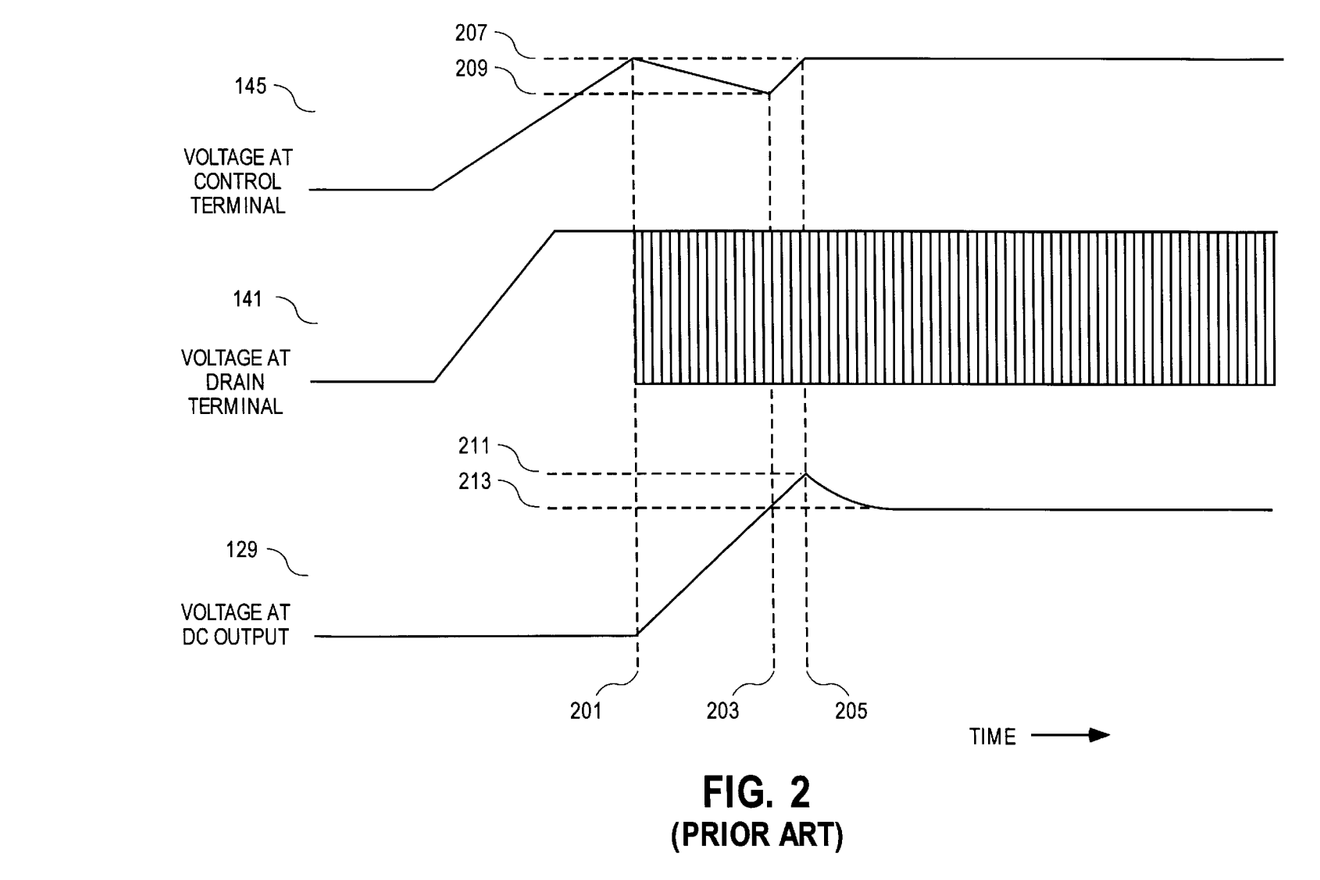
FIG. 2 is a timing diagram illustrating waveforms during start up using a prior art power supply controller.

Once the switching starts, which is shown in FIG. 2 with drain terminal 141 being switched after time 201, the current source from the drain terminal 141 is typically turned-off. At this time, the bias supply current requirements of power supply controller 139 are typically provided by the external capacitor 151 that is connected to this combined electrical control terminal 145. The external capacitor 151 provides the bias supply requirements until the output reaches regulation. This is illustrated in FIG. 2 between time 201 and 203 with control terminal 145 being discharged from control terminal regulation voltage 207 to voltage 209. When the power supply output reaches the output regulation voltage, which is shown in FIG. 2 as DC output 129 reaching output regulation voltage 213, the external feedback circuitry that includes output sense circuit 131 and opto-coupler 133 provides current to combined electrical control terminal 145. The current provided to control terminal 145 is the sum of the bias supply current of power supply controller 139 and the feedback current. The duty cycle of the power supply controller 139 is inversely proportional to the feedback current to regulate the output voltage.

The problem with this approach is that during power-up of DC output 129, the external capacitor 151 connected to control terminal discharges to provide the bias supply current to power supply controller. This discharge is illustrated in FIG. 2 with control terminal 145 being discharged from control terminal regulation voltage 207 to voltage 209 between time 201 and time 203. Therefore, when DC output 129 reaches its output regulation voltage 213 and the current flows through the opto-coupler 133, the external capacitor 151 connected to the combined electrical control terminal 145 first needs to charge back-up to the control terminal regulation voltage 207. During this time, no current flows into the shunt regulator of power supply controller 139. Hence there is no feedback current, and the duty cycle remains at maximum level, even though the DC output voltage is at or above the output regulation voltage. This results in an output overshoot at the power supply output. This output overshoot is illustrated in FIG. 2 with DC output rising above the output regulation voltage 213 to voltage 211 at time 205. Note that the voltage at control terminal 145 is charged back up to the control terminal regulation voltage between time 203 and time 205.

This problem is exacerbated when a soft start circuitry is employed in power supply controller 139. The soft-start circuitry typically increases the time for the DC output 129 to reach the output regulation voltage, resulting in the external capacitor 151 discharging to an even lower voltage. It then takes longer for the capacitor 151 to charge back-up and this may result in even larger output over-shoot that the soft-start circuit was intended to reduce.

SUMMARY OF THE INVENTION

Power supply controller methods and apparatuses are disclosed. In one embodiment, a power supply controller includes a control terminal to supply power to the power supply controller. The control terminal is to be coupled to a capacitor and to be coupled to receive a bias supply current and a feedback current from an output of a power supply. A charging circuit is coupled to the control terminal to maintain a control terminal regulation voltage at the control terminal during a start up condition of the power supply. Additional features and benefits of the present invention will become apparent from the detailed description, figures and claims set forth below.

BRIEF DESCRIPTION OF THE DRAWINGS

The present invention detailed illustrated by way of example and not limitation in the accompanying figures.

DETAILED DESCRIPTION

A method and an apparatus providing a power supply controller with reduced overshoot during start up is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment, the present invention provides a power supply controller a simple way to reduce the output overshoot problem described above. The present invention accomplishes the reduction in overshoot in one embodiment by changing the control of the high voltage current source to charge the external capacitor during the soft-start time. In one embodiment, the high voltage current source is turned on during the soft-start time when both the control terminal voltage is below its control terminal regulation voltage and the power switch is in an off state.

In one embodiment, the combined electrical control terminal that provides the bias supply current and feedback current is also used normally for the auto-restart function. In a fault condition, such as an output short or a broken feedback loop, there will not be any current through the opto-coupler. This lack of current through the opto-coupler will result in discharging of the external capacitor connected to this control terminal. Normally there is a comparator in a shunt regulator that has a threshold lower than the control terminal regulation voltage. When the capacitor discharges below this level, the output power switch is disabled and the high voltage current source is turned back on again to charge the capacitor. The output can be enabled again when the capacitor charges back up to the control terminal regulation voltage or it can be enabled after a number of discharge/charge cycles of the control terminal.

In one embodiment, the present invention does not interfere with the auto-restart function, since the high voltage current source is only allowed to keep the voltage constant at the control terminal during the soft-start time. In one embodiment, the soft-start time typically is 10 ms, whereas the auto-restart on time is typically about 47 ms. This is the time it takes to discharge the external capacitor to the lower threshold. In one embodiment of the present invention, the combined electrical control terminal will stay at approximately constant voltage for 10 ms and then under fault conditions the voltage will gradually decrease and reach the lower threshold in an additional 47 ms.

Figure 3:
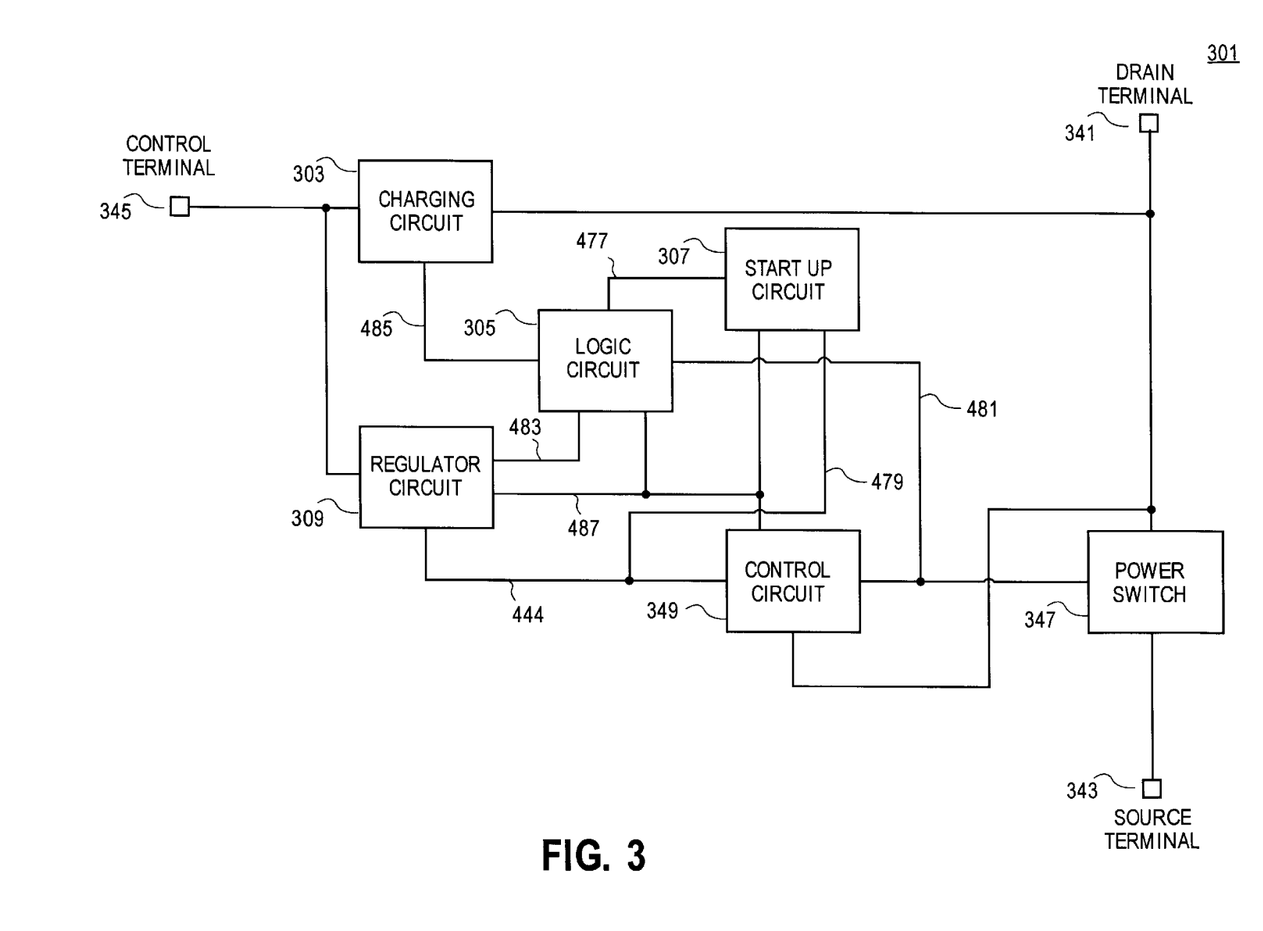
FIG. 3 is an illustration of one embodiment of a power supply controller in accordance with the teachings of the present invention.

FIG. 3 is a block diagram illustrating one embodiment of a power supply controller 301 in accordance with the teachings of the present invention. In one embodiment, power supply controller 301 may be used in place of power supply controller 139 of FIG. 1. As illustrated in FIG. 3, power supply controller 301 includes a charging circuit 303 coupled between a control terminal 345 and a drain terminal 341. In one embodiment, charging circuit 303 maintains a voltage at control terminal 345 during start up. Charging circuit 303 maintains the voltage at control terminal 345 with a high voltage current source in response to a signal 485 received from logic circuit 305. Power supply controller 301 includes a power switch 347 coupled between drain terminal 341 and source terminal 343. Power switch 347 is switched in response to signal 481 from control circuit 349. In one embodiment, logic circuit 305 generates signal 485 in response to a signal 477, received from start up circuit 307, signals 483 and 487 received from regulator circuit 309 and signal 481 received from control circuit 349. Control circuit 349 is coupled to receive a signal 444 generated by regulator circuit 309 and a signal 479 generated by start up circuit 307 superimposed on the same terminal.

During operation, the voltage at control terminal 345 is maintained at a regulation voltage during start up by charging circuit 303 after power switch 347 is switched in response to signal 485 from logic circuit. In one embodiment, after the DC output voltage is fully charged to the output regulation voltage, the voltage at control terminal 345 is no longer maintained using charging circuit 303 since control terminal 345 may be charged using feedback and bias circuit described in FIG. 1. In one embodiment, logic circuit 305 is able to determine a start up condition of power supply controller 301 using signal 477 from start up circuit 307. Logic circuit 305 is able to determine if the voltage at control terminal 345 has dropped below the control terminal regulation voltage using signal 483 from regulator circuit 309. In one embodiment, logic circuit 305 controls charging circuit 303 to charge control terminal 345 during an off condition of power switch 347. Logic circuit 305 is able to determine the off condition of power switch 347 using signal 481.

Figure 4:
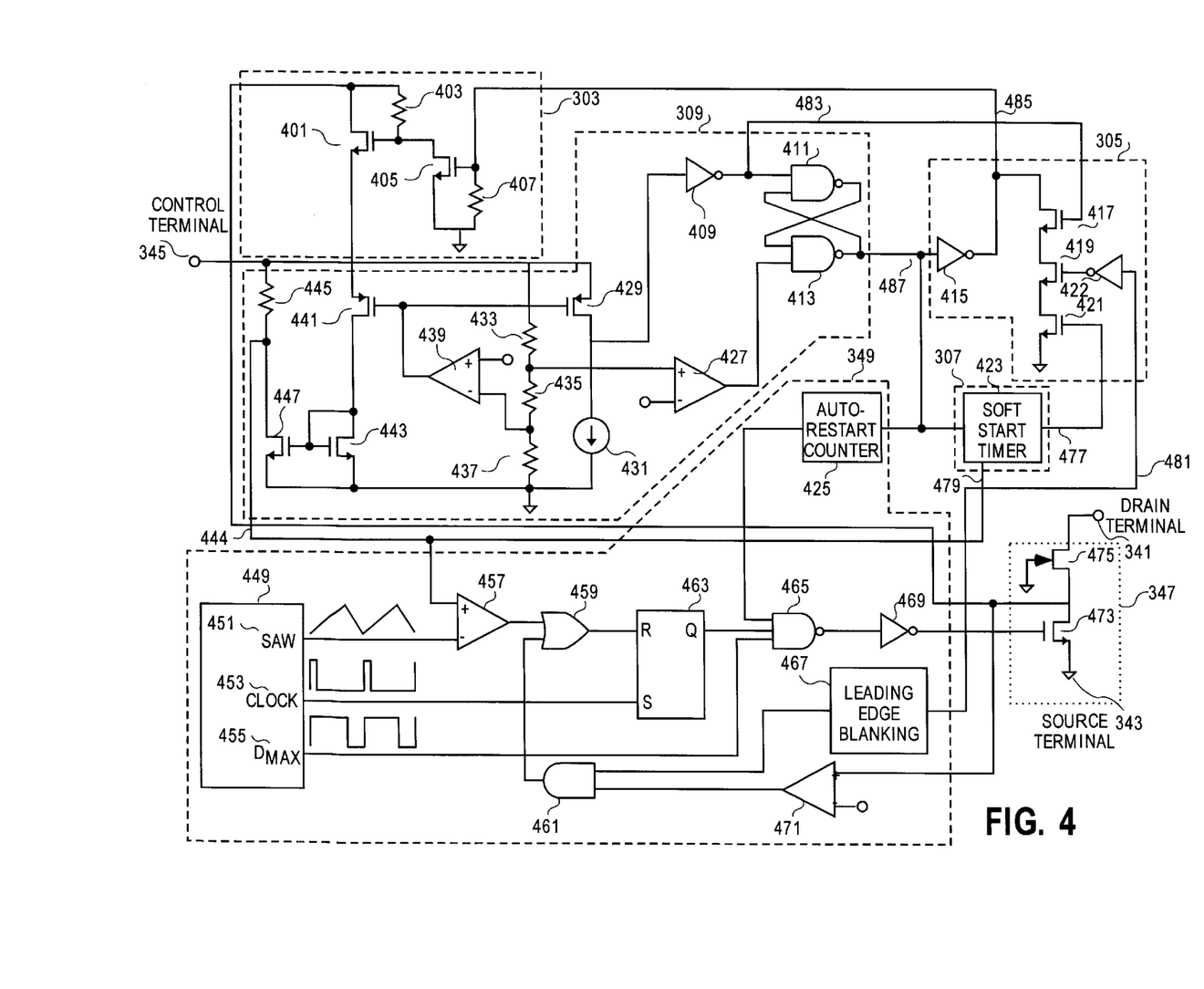
FIG. 4 is a schematic of one embodiment of a power supply controller in accordance with the teachings of the present invention.

FIG. 4 is a schematic illustrating one embodiment of a power supply controller 301 in accordance with teachings of the present invention. As illustrated, charging circuit 303 is coupled between control terminal 345 and drain terminal 341. Power switch 347 is coupled between drain terminal 341 and source terminal 343. In one embodiment, the source terminal 343 is coupled to ground. Logic circuit 305 is coupled to charging circuit 303 through the signal 485. Logic circuit 305 is coupled to start up circuit 307 through the signal 477. Logic circuit 305 is coupled to regulator circuit 309 through signal 483 and signal 487. Logic circuit 305 is coupled to control circuit 349 and power switch 347 through signal 481. Regulator circuit 309 is coupled to control circuit 349 through signal 444. In one embodiment, start up circuit 307 generates a signal 479 also coupled to be received by control circuit 309. In one embodiment, start up circuit 307 includes a soft start timer 423.

In one embodiment, control terminal 345 is the combined electrical terminal providing supply current and feedback current ($V_S$/feedback) to all blocks or the power supply controller 301. In one embodiment, regulator circuit 309 includes a shunt regulator block, which includes comparator 439, resistors 433, 435 and 437, and transistors 441 and 443. In one embodiment, the shunt regulator block is used to maintain a control terminal regulation voltage at control terminal 345. In one embodiment, the control terminal regulation voltage is approximately 5.7 volts. The shunt current passes through transistors 441 and 443. Transistors 443 and 447 form a current mirror. The feedback current signal is extracted using transistor 447. The voltage at the negative input of comparator 457 of control circuit 309 is the extracted feedback voltage signal 444. When there is no current through the shunt regulator, for example when the voltage at control terminal 345 is less than the regulation voltage, the voltage at the negative input of comparator 457 will stay high, and the output of comparator 457 will stay low. Therefore, the duty cycle of signal 481 in this case will be either maximum cycle or it will be limited by the current limit or soft start timer 423 of start circuit 307.

As the current through the shunt regulator increases, the voltage at the negative input of comparator 457 decreases. The output of comparator 457 will go high at a time during the cycle determined by the shunt current. When the output of comparator 457 goes high, the output of OR gate 459 will go high, and it will reset latch 463. This will terminate that particular on cycle of signal 481.

Current limit function of power supply controller 301 is provided by comparator 471, leading-edge blanking circuit 467 and AND gate 461. In one embodiment, soft start timer 423 gradually increases the duty cycle of the signal 481 generated by control circuit 309 during a start up condition of power supply controller 301. The output 479 of soft start timer 423, which is connected to the negative input of comparator 457, is a gradually decreasing current source starting from the time the power switch 347 begins to switch. The other output 477 of soft start timer 423 is a digital signal identifying the end of the soft start time.

During power-up, when the voltage across the combined electrical control terminal 345 reaches the control terminal regulation voltage (e.g. 5.7 volts), transistor 429 turns on and pulls the input of inverter 409 high. The output of inverter 409 then goes low to set a latch including NAND gates 411 and 413. The output of NAND gate 413 goes low and the output of inverter 415 goes high. Ignoring for the moment transistors 417, 419 and 421, the gate of transistor 405 is pulled high turning on transistor 405, which pulls the gate of transistor 401 low, thereby turning off the high voltage current source of charging circuit 303. In one embodiment, the high voltage current source of charging circuit 303 includes transistor 401.

In one embodiment, the output of NAND gate 413 is also coupled to auto-restart counter 425. When the output of NAND gate 413 goes low, the output of auto-restart counter 425 goes high to enable NAND gate 465, thus enabling power switch 347 to be switched through the output of inverter 469, which is signal 481. In one embodiment, power switch 347 includes power metal oxide semiconductor field effect transistor (MOSFET) 473 coupled in series with junction field effect transistor (JFET) 475 between drain terminal 341 and source terminal 343. As shown, the output of NAND gate 413 is also connected to soft-start timer 423. In one embodiment, soft start timer 423 gradually increases the maximum duty cycle of signal 481 received by power switch 347 during power-up.

In one embodiment, the control terminal regulation voltage of regulator circuit 309 is set at 5.7V. In one embodiment, there is a 47 uF capacitor (e.g. capacitor 151) connected externally to control terminal 345 and the bias supply current of the power supply controller is 1 mA. When the switching of power switch 347 begins, the voltage at control terminal 345 would slowly drop without the charging circuit 303 and logic circuit 305 of the present invention.

Under a fault condition, such as for example an output short or open loop, the external capacitor 151 coupled to control terminal 345 will discharge to 4.7V and the output of comparator 427 will go low to reset the latch including of NAND gates 411 and 413. The output of NAND gate 413 will go high and the output of inverter 415 will go low to turn-off transistor 405. This will enable the charging circuit 303 to charge the external capacitor 151 coupled to control terminal 345. The output of auto-restart counter 425 will also go low disabling the power switch 347 from being switched. In one embodiment, the auto-restart counter 425 can be designed to count up to for example 8 discharge/ charge cycles for the output to be enabled again.

As illustrated in FIG. 4, one embodiment of logic circuit 305 includes inverters 415 and 422, and transistors 417, 419, and 421 coupled in series between the output of inverter 415 and ground. The gate of transistor 417 is coupled to the output of inverter 409, signal 483. In one embodiment, signal 483 indicates if the voltage at control terminal drops below the control terminal regulation voltage (e.g. 5.7 volts). The gate of transistor 421 is coupled to receive signal 477 from soft start timer 423. In one embodiment, signal 477 indicates a start up condition of power supply controller 301. The gate of transistor 419 is coupled to receive an inverted signal 481 through inverter 422. In one embodiment, signal 481 is the signal used to switch power switch 347 and therefore indicates when an off condition occurs in power switch 347.

During the soft-start time of power supply controller 301, as indicated by signal 477, when power switch is off, as indicated by signal 481, and also when the control terminal 345 is below the control terminal regulation voltage, as indicated by signal 483, the gates of transistors 417, 419, and 421 will all be in high state turning on the transistors. In one embodiment, when transistors 417, 419, and 421 are all on at the same time, they will pull down the output signal 485 of inverter 415 low, even if the input to inverter 415 is low.

In one embodiment, inverter 415 includes a p-channel transistor coupled in series with an n-channel transistor (not shown) between power and ground. The gates of the p and n-channel transistors are coupled to the input of inverter 415 and the drains of the p and n-channel transistors are coupled to the output of inverter 415. In one embodiment, transistors 417, 419, and 421 are designed so that they can over-power the p-channel transistor of inverter 415 and pull the output signal 485 of the inverter 415 low when they are on. When the output signal 485 of the inverter 415 is low, transistor 405 is off, thereby turning on transistor 401 and enabling the charging circuit 303. Therefore, the control terminal 345 will not discharge during the soft-start time, as indicated by signal 477.

In one embodiment, the soft-start time is approximately 10 ms, which is designed to be greater than the output rise time, which is approximately 2 to 10 ms, of DC output 129. In one embodiment, when the DC output 129 reaches the output regulation voltage, the control terminal 345 will have been maintained at the control terminal regulation voltage and the duty cycle of signal 481 switching power switch 347 can be reduced immediately to perform the output regulation. Once the current is provided to control terminal 345 through the opto-coupler 133, the gate of transistor 417 will go low and transistors 417,419 and 421 will be transparent to the operation of the power supply controller 301. If there is a fault condition and current to control terminal 345 never develops through the opto-coupler 133, then after the soft-start time (e.g. 10 ms) the gate of transistor 421 will go low, and transistors 417, 419 and 421 will be transparent again to the auto-restart operation. Indeed, since transistors 417, 419 and 421 are coupled in series, only one of them needs to be off to disconnect them from the rest of the circuitry. It is appreciated that other logic configurations may be used to realize the logic provided by transistors 417, 419 and 421 in accordance with the teachings of the present invention.

Figure 5:
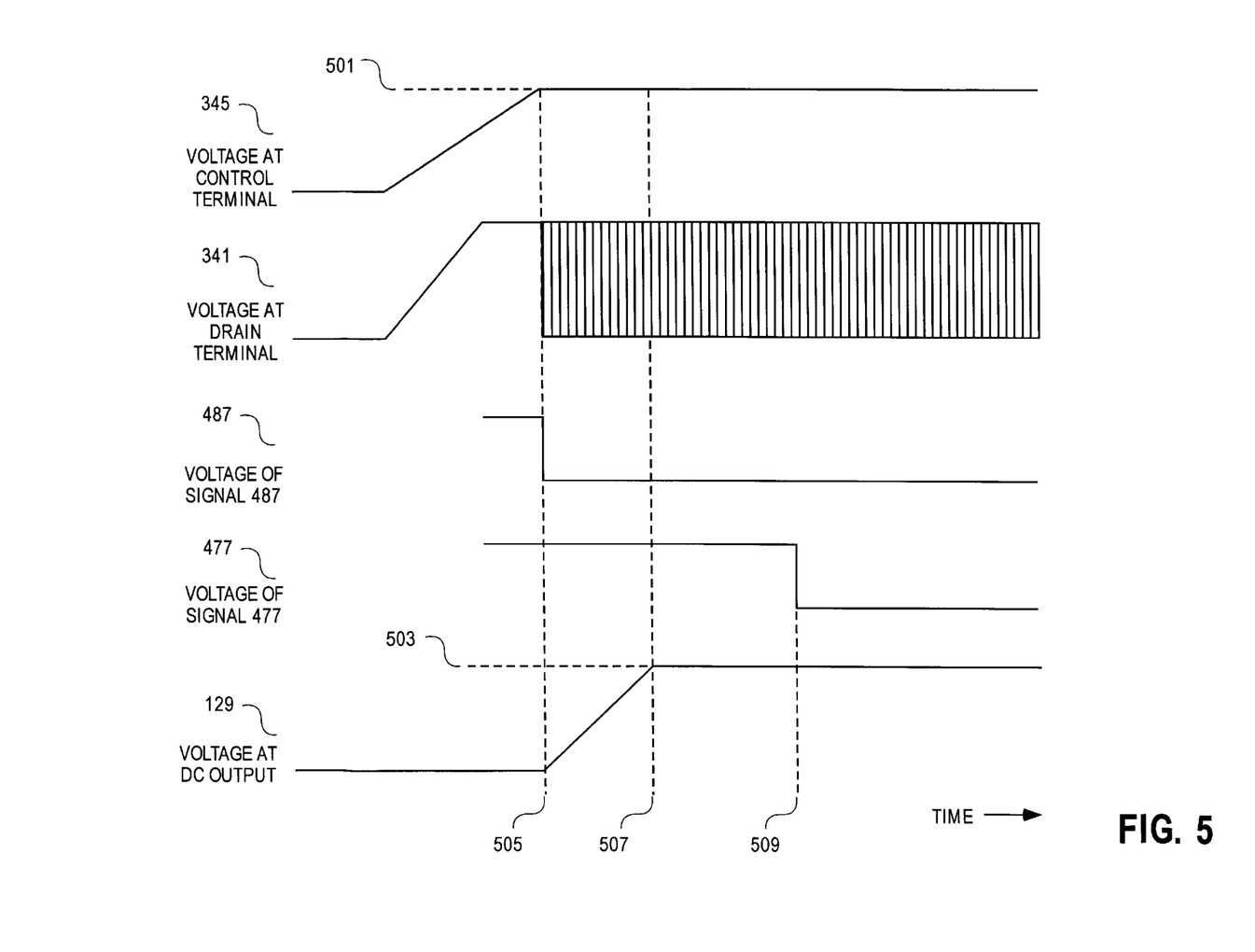
FIG. 5 is a timing diagram illustrating waveforms during start up using one embodiment of power supply controller in accordance with the teachings of the present invention.

FIG. 5 is a timing diagram illustrating waveforms during start up using one embodiment of power supply controller 301 in accordance with the teachings of the present invention. As illustrated, the voltage at control terminal 345 reaches the control terminal regulation voltage 501 at time 505. At this time, the output signal 487 of NAND gate 413 goes low enabling power switch 347 to begin switching. Signal 477 remains high at this time during the start up condition of power supply controller 301 until time 509. When power switch 347 begins switching at time 505, the DC output 129 may be charged to the output regulation voltage 503.

As illustrated, DC output 129 reaches the output regulation voltage at time 507. Since the control terminal 345 is maintained at the control terminal regulation voltage 501 during start up, the duty cycle of signal 481 can be adjusted or reduced immediately once the DC output 129 reaches the output regulation voltage 503. Indeed, current from opto-coupler 133 is used by the regulator circuit 309 to regulate the DC output 129 voltage instead of having to recharge the external capacitor 151 back to the control terminal regulation voltage at time 507. Therefore, overshoot in the DC output 129 due to external capacitor 151 having to be recharged is reduced or eliminated during power-up in accordance with the teachings of the present invention. In one embodiment, the DC output 129 voltage reaches the output regulation voltage 503 before the end of the start up time 509 under normal conditions of power supply controller 301.

Figure 6:
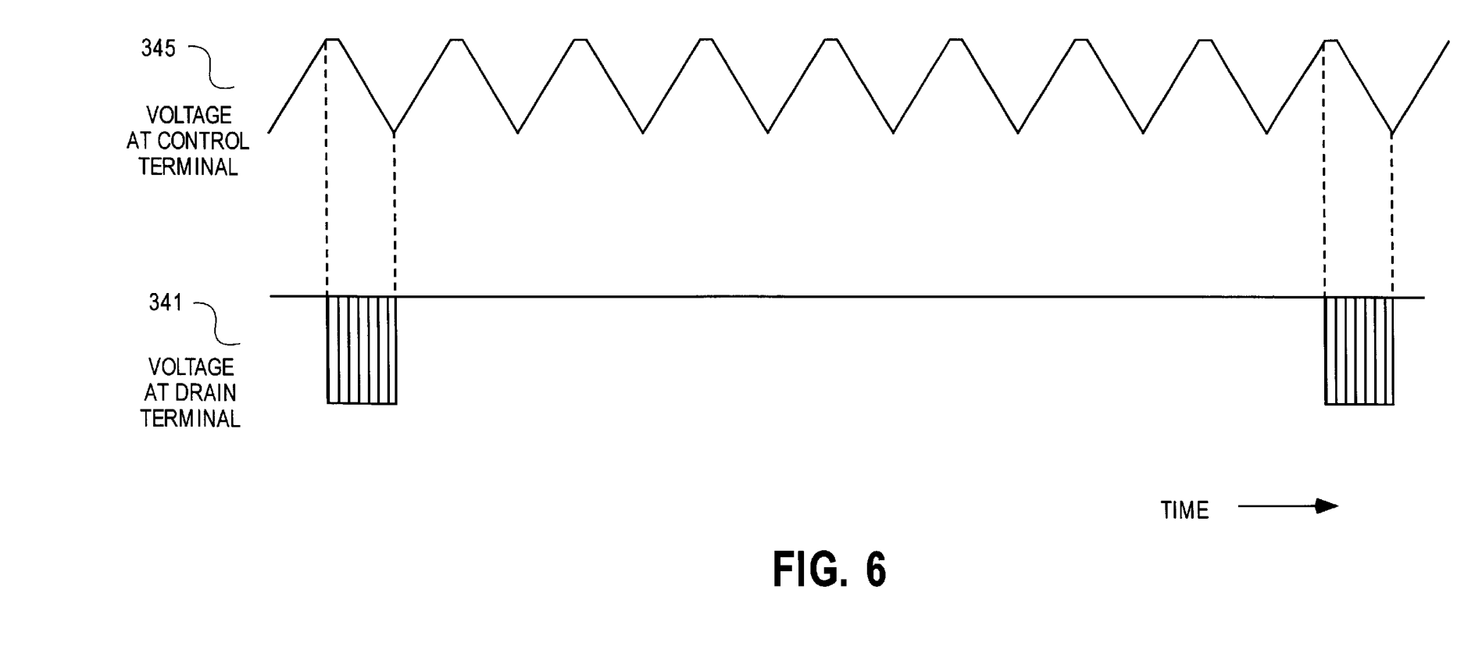
FIG. 6 is a timing diagram illustrating auto-restart waveforms using one embodiment of power supply controller in accordance with the teachings of the present invention.

FIG. 6 is a timing diagram illustrating auto-restart waveforms using one embodiment of power supply controller in accordance with the teachings of the present invention. As mentioned earlier, the auto-restart counter 425 in one embodiment can be designed to count up to for example 8 discharge/charge cycles of control terminal 345 before the DC output 129 is to be enabled again. DC output 129 is enabled by switching power switch 347. FIG. 6 shows that control terminal 345 is discharged and charged for eight cycles between instances in which drain terminal 341 shows that power switch 347 is switched. In one embodiment, control terminal is discharged and charged between 4.7 volts and 5.7 volts during the above-described auto-restart condition of power supply controller 301. With the charging circuit 303 and logic circuit 305 of the present invention, the control terminal 345 is maintained at the control terminal regulation voltage (e.g. 5.7 volts) during the start up period as indicated by signal 477. In one embodiment, the start up period is merely approximately 10 ms in duration. Therefore, the control terminal is maintained at the control terminal regulation voltage for 10 ms during each discharge and charge cycle of the auto-restart sequence in accordance with the teachings of the present invention. It is appreciated that maintaining the control terminal 345 at the control terminal regulation for the start up period has relatively little impact if any on the impact on the auto-restart duty cycle of a power supply controller in accordance with the teachings of the present invention.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A power supply controller, comprising:
   a control terminal to supply power to the power supply controller, the control terminal coupled to receive a bias supply current and a feedback current from an output of a power supply;
   a charging circuit coupled between the control terminal and a drain terminal, the charging circuit to maintain a control terminal regulation voltage at the control terminal during a start up condition of the power supply.

2. The power supply controller of claim 1 further comprising a logic circuit coupled to the charging circuit, the logic circuit to indicate to the charging circuit the start up condition of the power supply and if a voltage at the control terminal is less than the control terminal regulation voltage.

3. The power supply controller of claim 2 further comprising:
   the drain terminal to be coupled to a primary winding of a transformer of the power supply;
   a source terminal to be coupled to ground; and
   a power switch coupled between the drain terminal and the source terminal, the power switch to control the output of the power supply, the power switch to be switched in response to the feedback current.

4. The power supply controller of claim 3 further comprising a control circuit coupled to the control terminal and the power switch, the control circuit to switch the power switch in response to the feedback current.

5. The power supply controller of claim 4 wherein the logic circuit is further coupled to control circuit, the logic circuit to indicate to the charging circuit the start up condition of the power supply, if the voltage at the control terminal is less than the control terminal regulation voltage and an off condition of the power switch.

6. The power supply controller of claim 4 wherein the control circuit is further coupled to receive a signal representative of a current through the power switch, the control circuit to switch the power switch in response to the signal representative of the current through the power switch.

7. The power supply controller of claim 2 further comprising:
   a start up circuit coupled to the logic circuit, the start up circuit to indicate the start up condition of the power supply to the logic circuit; and
   a regulator circuit coupled to the logic circuit and coupled between the control terminal and the control circuit, the regulator circuit to indicate if the voltage at the control terminal is less than the control terminal regulation voltage.

8. A method for controlling a power supply, comprising:
   charging a control terminal to a control terminal regulation voltage of a power supply controller to start up the power supply;
   charging an output of the power supply to an output regulation voltage after the control terminal is charged to the control terminal regulation voltage; and
   maintaining the control terminal at the control terminal regulation voltage with a charging circuit coupled between the control terminal and a drain terminal as the output of the power supply is charged to the output regulation voltage during start up of the power supply.

9. The method of claim 8 wherein maintaining the control terminal at the control terminal regulation voltage comprises charging the control terminal with the charging circuit during a period of time when a voltage at the control terminal falls below the control terminal regulation voltage during start up of the power supply.

10. The method of claim 8 wherein charging the output of the power supply to the output regulation voltage comprises switching a power switch of the power supply controller, the power switch coupled to a primary winding of a transformer of the power supply.

11. The method of claim 10 wherein maintaining the control terminal at the control terminal regulation voltage comprises switching the charging of the control terminal to be charged with the charging circuit in alternating fashion with the power switch during a period of time when a voltage at the control terminal falls below the control terminal regulation voltage during start up of the power supply.

12. The method of claim 10 further comprising supplying a feedback current from the output of the power supply to the control terminal and a bias supply current from a bias winding of the transformer to the control terminal to charge the control terminal after start up of the power supply.

13. A power supply controller, comprising:
   a power switch coupled between a drain terminal and a source terminal, the drain terminal to be coupled to a primary winding of a transformer of a power supply, the source terminal to be coupled to ground;
   a control circuit to switch the power switch in response to a feedback current received at a control terminal from an output of the power supply, the control terminal to supply power to the power supply controller, the control terminal to be charged by the feedback current and a bias supply current received from a bias winding of the transformer; and
   a charging circuit coupled between the control terminal and the drain terminal, the charging circuit to charge the control terminal before the power switch is switched, the charging circuit to maintain a control terminal regulation voltage at the control terminal before the output of the power supply is charged to an output regulation voltage during start up of the power supply.

14. The power supply controller of claim 13 further comprising a logic circuit coupled to the charging circuit to charge the control terminal in response to the logic circuit.

15. The power supply controller of claim 14 further comprising a regulator circuit coupled to the control terminal, the logic circuit and the control circuit, the regulator circuit to indicate to the logic circuit when a voltage at the control terminal is less than the control terminal regulation voltage.

16. The power supply controller of claim 15 further comprising a start up circuit coupled to the logic circuit and the control circuit, the start up circuit to indicate to the logic circuit when the power supply is in start up.

17. The power supply controller of claim 16 wherein the logic is further coupled to the control circuit, the logic circuit to be switched in response to the control circuit in an alternating fashion with the power switch.

18. The power supply controller of claim 17 wherein the logic circuit comprises first, second and third switches coupled in series between the charging circuit and the source terminal, the first switch to be switched in response to the regulator circuit, the second switch to be switched in response to the control circuit and the third switch to be switched in response to start up circuit.

19. The power supply controller of claim 13 wherein the charging circuit comprises a current source coupled between the drain terminal and the control terminal, the current source to be activated in response to the logic circuit.

20. The power supply controller of claim 13 wherein the power switch comprises a power metal oxide semiconductor field effect transistor (MOSFET) coupled between the drain terminal and the source terminal, the power MOSFET to be switched in response to the control circuit.

21. The power supply controller of claim 15 wherein the regulator circuit comprises a shunt regulator coupled to the control terminal, the shunt regulator to extract an excess feedback current from the bias supply current from the control terminal, the excess feedback current coupled to be received by the control circuit, the power switch to be switched in response to the excess feedback current.

22. The power supply controller of claim 16 wherein the start up circuit comprises soft start circuitry coupled to the control circuit, the control circuit to switch the power supply circuit in response to the soft start circuitry.

* * * * *